United States Patent [19]

Korzeniowski

[11] Patent Number: 4,716,208
[45] Date of Patent: Dec. 29, 1987

[54] FLUORINE-CONTAINING COPOLYMERS

[75] Inventor: Stephen H. Korzeniowski, Wilmington, Del.

[73] Assignee: E. I. Du Pont de Nemours and Company, Wilmington, Del.

[21] Appl. No.: 766,069

[22] Filed: Aug. 14, 1985

Related U.S. Application Data

[63] Continuation of Ser. No. 578,009, Feb. 13, 1984, abandoned, which is a continuation of Ser. No. 479,738, Mar. 28, 1983, abandoned.

[51] Int. Cl.$^4$ .............................................. C08F 20/22
[52] U.S. Cl. ...................................... 526/245; 428/421
[58] Field of Search ............................... 526/245, 292.3

[56]  References Cited

U.S. PATENT DOCUMENTS 3,920,614  11/1975  Kirimoto et al. ................... 526/245
3,997,507  12/1976  Kirimoto et al. ................. 526/292.3
4,296,224  10/1981  Fukui et al. ......................... 526/245

Primary Examiner—Paul R. Michl

[57] ABSTRACT

Polymers containing by weight (i) from about 50 to about 85 parts of units derived from at least one monomer (FM) having the formula

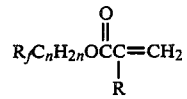

wherein
$R_f$ is straight or branched-chain perfluoroalkyl containing 4–20 carbons;
R is H or $CH_3$; and
n is an integer from 1–15;

and (ii) from about 50 to about 15 parts of units derived from 3-chloro-2-hydroxypropyl methacrylate and/or acrylate (CHPM/A) or their bromo analogs. Preferably, the polymers contain by weight between 65 and 75 parts of units derived from FM and 35–25 parts of units derived form CHPM/A, particularly a copolymer consisting essentially by weight of 75 percent of a mixture of FM and 25 percent of CHPM. Polymers impart superior oil- and water-repellency and anti-soiling characteristics to fibrous substrates, and may be applied as a spin finish, particularly to nylon filaments.

14 Claims, No Drawings

FLUORINE-CONTAINING COPOLYMERS

CROSS-REFERENCE TO RELATED APPLICATION

This application is a continuation of application Ser. No. 578,009 filed Feb. 13, 1984, which is a continuation-in-part of U.S. Ser. No. 479,738, filed Mar. 28, 1983 both of which prior applications are now abandoned.

BACKGROUND OF THE INVENTION

This invention relates to fluorine-containing acrylic copolymers which impart durable oil- and water-repellency and dry soil resistance to substrates. This invention relates also to processes of treating fibrous and filamentary substrates so as to give them durable oil- and water-repellency and dry soil resistance. It relates also to aqueous emulsions containing such fluorine-containing polymers and to substrates treated with such emulsions, particularly nylon filaments and fibers.

DETAILED DESCRIPTION OF THE INVENTION

The polymers of the present invention contain (i) from about 50 to about 85 parts by weight of units derived from a monomer or mixture of monomers having the formula

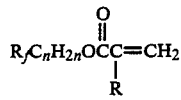

and (ii) from about 50 to about 15 parts by weight of units derived from one or more monomers having the formula

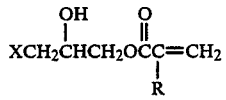

wherein $R_f$ is straight or branched-chain perfluoroalkyl containing 4–20 carbons;

R is H or $CH_3$;

n is an integer from 1–15; and

X is Cl or Br. Preferably, the polymers of this invention contain between 65 and 75 parts by weight of units derived from the fluorinated monomer or mixture of fluorinated monomers and 35–25 parts by weight of units derived from 3-chloro-2-hydroxypropyl methacrylate and/or acrylate. A particularly preferred polymer of this invention consists essentially of 75 weight percent of a mixture of the fluorinated monomers (i) and 25 weight percent of 3-chloro-2-hydroxypropyl methacrylate. Of nearly as much interest for the purposes of this invention is the polymer consisting essentially of 65 weight percent of a mixture of the fluorine-containing monomers (i) and 35 weight percent of 3-chloro-2-hydroxypropyl methacrylate.

The fluorinated monomers most preferred for the present invention are those wherein R is $CH_3$ and $R_f$ is a mixture of perfluoroalkyl groups, $CF_3CF_2(CF_2)_x$ in which X is 2, 4, 6, 8, 10 and 12 in the approximate weight ratio of 2/35/30/18/8/3. Such a mixture of monomers has a weight average molecular weight of 522. That type of monomer is shown by U.S. Pat. Nos. 3,282,905 and 4,147,851, and corresponding fluorinated acrylates are shown by U.S. Pat. No. 3,645,989. The 3-chloro-(or 3-bromo-)2-hydroxypropyl acrylate or methacrylate monomer can be prepared by a variety of known techniques. Thus, for example, one can react glacial acrylic or methacrylic acid with epichlorohydrin (or epibromohydrin) as shown in U.S. Pat. No. 3,799,915. Alternatively, one can react acrylyl or methacrylyl chloride with glycerol alpha-monochlorohydrin (or glycerol alpha-monobromohydrin) as in U.S. Pat. No. 2,567,842. Preferably, 3-chloro-2-hydroxypropyl methacrylate is prepared by reacting ≧2 two mols of glacial methacrylic acid per mol of epichlorohydrin.

The polymers of the present invention can be prepared by the use of well-known polymerization techniques and conditions. Typically, a mixture of the monomers in an inert solvent is polymerized in the presence of a free-radical initiator and a chain transfer agent. Any conventional neutral solvent such as methyl isobutyl ketone, methyl ethyl ketone, methyl n-amyl ketone, 1,1,2-trifluoro-1,2,2-trichloroethane, xylene, and the like and mixtures thereof can be used, with methyl isobutyl ketone being preferred. Conventional free radical initiators such as peroxy compounds and azo compounds which are soluble in the solvent system can be used, e.g., 2,2'-azo-bis(2-methylbutanenitrile), 2,2'-azo-bis(2-methylpropanenitrile), benzoyl peroxide, and the like. Initiator concentration can be between about 1 and 6% based on the total weight of monomers. Likewise, conventional chain transfer agents, such as dodecylmercaptan, isooctyl thioglycolate, and the like, in amounts between about 1 and 10% by weight of the total weight of the monomers, can be used to control the molecular weight of the polymers. The reaction must be carried out at a temperature which is at least sufficient to assure that the fluorinated monomer is molten; typically, temperatures between 60° and 160° C. are used.

The polymers of the present invention are useful in imparting durable oil- and water-repellency to a wide range of fibrous materials. They are also useful in providing durable dry soil resistance to substrates such as carpeting. They are particularly useful for providing a durable anti-soiling coating composition for textile filaments and articles made from such filaments. The polymers of this invention can thus be applied to textile filaments as a spin finish during filament manufacture without disrupting yarn processability. The spin finish application technique, sometimes called a threadline application, is illustrated by U.S. Pat. No. 4,325,857. The polymers of this invention after such application remain durable to subsequent processing and dyeing treatments, particularly when applied to nylon filaments as exemplified in that patent and the Examples herein.

Particularly noteworthy are filaments and fibers having dispersed therethrough a polyalkylene ether or a polyoxyalkylene borate as disclosed in U.S. Pat. Nos. 3,329,557, 3,475,898 and 4,052,493. In one commercial application, nylon filaments have been prepared which have dispersed through them a reaction product of boric acid and a polyoxyalkylene material. While such nylon filaments have commercial advantages, some commercial fluorine-containing anti-soiling agents are not as durable on them as desired, particularly when using the threadline application technique. The polymers of the present invention provide superior durability when used as anti-soiling agents on such modified nylon, and notably so when the threadline application technique is used.

The polymers of the present invention are adapted to be marketed commercially in the form of stable aqueous dispersions. Both anionic and cationic dispersing agents are suitable for preparation of dispersions in this invention. Typical anionic dispersing agents such as sodium lauryl sulfate, sodium dodecylbenzene sulfonate and dioctyl sulfosuccinate and the like and mixtures thereof can be used, with sodium dodecylbenzene sulfonate being preferred. Conventional cationic dispersing agents such as dodecyl trimethylammonium chloride, octadecyl trimethylammonium chloride, dodecyl dimethylamine acetate, octadecyl dimethylamine acetate, bis(polyethyleneoxy)alkylmethylammonium methosulfate and poly(difluoromethylene),alpha-fluoro-omega-[2-[[2-(trimethylammonio)ethyl]thio]ethyl],-methyl sulfate and the like and mixtures thereof can be used. These dispersions can be applied to a wide variety of substrates by conventional technique, such as by spraying, dipping, padding, roller-coating (threadline application) or exhaust techniques.

The following tests were used to evaluate the end use properties of the polymers of the present invention on a variety of fibers and fabrics. Temperatures are in degrees Celsius.

Solvent Nylon 66 Knit Fabric Test

The polymer is applied as a dilute solution containing about 660 ppm polymer fluorine. The nylon 66 knit fabric is cut into pieces measuring 10.2–11.4×16.5 cm and weighing 4.8±0.3 g each. A 10-gram aliquot of the polymer solution, diluted with acetone to a volume of about 14.0 cc provides about 660 ppm of fluorine. The 14 cc quantity of the polymer solution is poured into the middle of a fabric piece which is contained in an aluminum tray. The piece of fabric is folded and turned for about 2 minutes, thereby to effect even distribution of the fluoropolymer and even drying of the fabric. The fabric is hung vertically, rotated through 180° after about one minute, and again through 180° after about one more minute; at which point it should be nearly dry to the touch. Thereafter, it is permitted to hang for an additional 10 minutes. A portion of the dried, treated nylon fabric is then analyzed for fluorine content by the method described below.

Fluoride Determination

A suitably sized piece (0.01–0.10 g) of the substrate organic material is decomposed or volatilized in the presence of wet oxygen and swept through an oxyhydrogen flame in a closed quartz apparatus. The combustion products are collected in an aqueous solution. Fluoride ion in water is determined from the difference between an ion selective electrode potential found in the sample and in the standardizing solution. Alternatively, the potential of a fluoride ion specific and calomel electrode system in a buffered, known volume of an aqueous solution of unknown fluoride content is determined from a predetermined calibration curve of fluoride ion concentration versus potential.

Aqueous Nylon Fabric Test

Weighed specimens of the fabric are padded with an aqueous dispersion of the polymers of this invention. The wet fabrics are weighed and the percent wet pickup is determined (a measure of the fluorine content of the specimen). Excess liquid is expressed by running the specimens through nip rolls twice, and they are then air-dried on a screen, turning every 10 minutes. Each specimen is then cut into pieces, one or more of which is cured at elevated temperature. Both the air-dried piece and the cured piece are conditioned at 23±2° and 65±10% relative humidity for at least 2 hours. A strip of each conditioned specimen is removed for fluorine content determination. The remaining portions of the specimens are given the Oil- and Water-Repellency Tests and the Nylon Fabric Home Wash Durability Test.

Oil- and Water-Repellency Tests (Adapted From AATCC Test Method 118)

A piece of fabric, treated with a solution or aqueous dispersion of the polymers of this invention, is conditioned for a minimum of 2 hours at 23±2° and 65±10% relative humidity. The repellency of carpet samples should be measured on the side of the yarn, not on the tips of the tufts. Beginning with the lowest numbered test liquid (Repellency Rating No. 1), one drop (approximately 5 mm diameter or 0.05-ml volume) is placed on each of three locations at least 5 mm apart. The drops are observed for 10 seconds for the water-repellency test, 30 seconds for oil-repellency test. If, at the end of those periods of time, two of the three drops are still spherical to hemispherical in shape with no wicking around the drops, three drops or the next higher numbered test liquid are placed on adjacent sites and observed again for the specified periods of time. The procedure is continued until one of the test liquids results in two of the three drops failing to remain spherical or hemispherical, or wetting or wicking occurs. The oil-repellency rating and the water-repellency rating of the yarn, fabric or carpet each is the highest numbered test liquid for which two of three drops remain spherical or hemispherical with no wicking for the specified time.

| STANDARD WATER TEST LIQUIDS | | |
|---|---|---|
| | Composition (Volume %) | |
| Water-Repellency Rating Number | Isopropanol (Reagent Grade) | Distilled $H_2O$ |
| 1 | 2 | 98 |
| 2 | 5 | 95 |
| 3 | 10 | 90 |
| 4 | 20 | 80 |
| 5 | 30 | 70 |

| STANDARD OIL TEST LIQUIDS | |
|---|---|
| Oil-Repellency Rating Number | Composition |
| 1 | "Nujol"* |
| 2 | 65/35 "Nujol"/n-hexadecane by volume at 21° |
| 3 | n-hexadecane |
| 4 | n-tetradecane |
| 5 | n-dodecane |
| 6 | n-decane |

*"Nujol" is the trademark of Plough, Inc., for a mineral oil which has a Saybolt viscosity of 360/390 at 38° and a specific gravity of 0.880/0.900 at 15°.

Nylon Fabric Home Wash Durability Test (Modification of AATCC Test Method 130)

The specimens which have been air-dried and/or cured as described above are conditioned as before. A portion of each specimen is removed and a fluorine determination run on it. The remaining portion of each specimen is cured at elevated temperature and washed: 4-lb load with 28 g of "Tide" detergent, at a 12-minute cycle, a temperature of 60±3° and a cold rinse. The specimens are dried at 71±9° for 40 minutes. The foregoing washing and drying steps constitute one Home Wash Cycle. Thereafter, the specimens are conditioned, oil- and water-repellency are measured and fluorine determinations are made.

Yarnline Finish Application

Nylon 66 carpet yarn, 1350 denier, 20 denier per filament, containing no finish is pulled in a taut condition through an electric muffle furnace heated at 100° and then over a ceramic-faced kiss roll. The kiss roll, rotating in the direction of yarn travel at 15–25 rpm through a finish bath, applies to the yarn the aqueous dispersion of the polymer of this invention with or without other additives, such as "Tween 80". Thereafter, the yarn passes around a driver wheel, on which its temperature reaches 70° then through a metal arc kept at 225°, and then to a second driver wheel on which the yarn temperature reaches 80°.

Mock Beck Dye Test

The test is conducted in at Atlas "Launder-Ometer", Meter LHD-EF, equipped with 1.2 liter 2.×.9 cm cylindrical cups and a yarn winding framework measuring 7.3×2.5×15.2 cm. The mock dye bath is made up of deionized water, adjusted to 50 ppm hardness, containing on the weight of the bath 0.0125% of "Avitone" T dyeing assistant (anionic sodium hydrocarbon sulfonate), 0.0250% "Merpol" DA surfactant (nonionic ethylene oxide condensate), 0.0050% "Versene" 100 sequestrant (tetrasodium salt of ethylene diamine tetraacetic acid) and "Foamgard" jet defoamer (nonionic emulsifiable hydrocarbon). The pH is adjusted to 9±0.5 with trisodium phosphate. A single layer of 60±5 turns of yarn (3.0±0.25 g) is wound on the yarn winding framework and inserted into a cylindrical cup along with 100 ml of the mock dye bath. The cylindrical cup is attached to a rotor which rotates around a horizontal axis at about 40 rpm. As the rotor rotates, the cylindrical cup is caused to travel through a water bath. During the first hour of the cycle, the water bath is heated progressively to about 99°, at which temperature it is held for another 3 hours while the yarn sample in the cylindrical cup is rotated through the bath. The water bath is then cooled to about 49° while rotation of the rotor is continued. Then the yarn winding framework is removed from the cylindrical cup, rinsed in water at room temperature and air-dried.

The following examples are illustrative of the invention. Unless otherwise indicated, all parts are by weight and temperatures are in degrees centigrade. The weight percentages of monomer units in the polymers are based on the weights of monomers charged to the reaction.

EXAMPLES 1–3

Preparation of 3-Chloro-2-hydroxypropyl Methacrylate

To a 250 ml four-necked flask with a heating mantle, agitation means, thermometer, nitrogen sweep and reflux condenser topped with a nitrogen bubbler were charged the following:

Glacial methacrylic acid 86.0 g (about 1 mol)
Epichlorohydrin 84.0 g (about 0.9 mol)
Benzyltriethylammonium chloride 8.6 g (about 0.038 mol)
Methanol 21.4 g.

With agitation, nitrogen flow and condenser water on, the mixture was heated to 45±5° for about 18 hours. Thereafter, the reaction mixture was permitted to cool to 20° and the reaction mixture was washed with a mixture of 5% aqueous sodium bicarbonate (250 ml) and ethyl acetate (200 ml). The upper organic layer was separated and the aqueous layer was washed twice with 100 ml of ethyl acetate. All of the ethyl acetate layers were combined and washed twice with 200 ml of 5% sodium bicarbonate and 4 times with 200 ml of deionized water. The ethyl acetate layer was dried over sodium sulfate for about 4 hours. Most of the ethyl acetate was evaporated in a Rotovap device, and then under 10 mm Hg vacuum for an hour to give 122.1 g of a yellow somewhat viscous liquid, a yield of 75.6%. Infrared analysis confirmed the presence of 3-chloro-2-hydroxypropyl methacrylate.

Preparation of 1,1,2,2-Tetrahydroperfluoroalkyl Methacrylate/3-Chloro-2-hydroxypropyl Methacrylate Copolymer Three polymerizations were run using the above-described 3-chloro-2-hydroxypropyl methacrylate (CHPM) and a mixture of fluorinated methacrylates (FM) having the formula

wherein X is 2, 4, 6, 8, 10 and 12 in the respective relative amounts of 2:35:30:18:8:3 as determined by gas phase chromatographic analysis, said monomer mixture having a weight average molecular weight of 522. In each of the polymerizations, 2,2'-azo-bis-(2-methyl-butanenitrile) (AMBN) was used as a free-radical initiator and dodecyl mercaptan (DM) was used as a chain transfer agent. The proportions of the various constituents are set forth below.

|      | Example |       |       |
|------|---------|-------|-------|
|      | 1       | 2     | 3     |
| FM   | 170 g   | 170 g | 150 g |
| CHPM | 30 g    | 30 g  | 50 g  |
| AMBN | 4 g     | 4 g   | 4 g   |
| DM   | 2 g     | 6 g   | 6 g   |

In each of Examples 1, 2 and 3, the FM, CHPM and DM in 220 g of methylisobutylketone (MIBK) were charged to a 1-liter pot, and with agitation, the mixture was heated under nitrogen to 70±3°; at which temperature it was sparged for an hour with nitrogen. In each Example, AMBN was dissolved in an additional 20 g of MIBK and sparged with nitrogen in a small addition funnel for an hour; after which it was added to the pot over a period of 15 minutes. Under nitrogen, agitation was thereafter continued at 70±3° for about 18 hours. It was then heated to 90° and held there for one hour. All three polymerization runs gave light yellow polymer solutions containing some white stringy material in the pot, probably about 5–10 g; Example 3 contained the most white stringy material. Examples 1–3 gave the following quantities of polymeric products.

through five home washer cycles by the Aqueous Nylon 66 Knit Fabric Test to give the following.

|  | Nylon 66 Knit Fabric | | | PEO-Containing Nylon Fabric* | | |
|---|---|---|---|---|---|---|
|  | Oil/Water Repellency | | % F Retained | Oil/Water Repelency | | % F Retained |
| Example | Cure 30 min 135° | Cure +5 Home Washes | Cure +5 Home Washes | Cure 30 min 135° | Cure +5 Home Washes | Cure +5 Home Washes |
| 1A | 0/4 | 0/3 | — | 4/0 | 0/4 | — |
| 1C | 6/5 | 6/5 | 90 | 5/5 | 3/5 | 59 |
| 2A | 3/5 | 0/4 | 78 | 5/3 | 1/5 | 88 |
| 2C | 6/5 | 6/5 | 79 | 6/5 | 5/5 | 89 |
| 3A | 2/5 | 0/4 | 80 | 2/4 | 1/5 | 73 |
| 3C | 6/5 | 6/5 | 90 | 6/5 | 4/5 | 69 |

*Fabric made from polyoxyethylene-containing nylon.

|  | Example | | |
|---|---|---|---|
|  | 1 | 2 | 3 |
| Weight | 438 g | 438.7 g | 453.2 g |
| Solids | 46.15% | 46.53% | 49.04% |

Portions of each of the polymer solutions of Examples 1-3 were diluted as follows with 1,1,2-trifluoro-1,2,2-trichloroethane (F-113). The resulting solutions were diluted further by adding 250 g of acetone to each. The 1,1,2-trifluoro-1,2,2-trichloroethane/acetone solutions of Example 1-3 were then applied to nylon 66 knit fabric, heat set at about 200° for 2 minutes, and evaluated for percent fluorine retention after five home washer cycles by the Solvent Nylon 66 Knit Fabric Test and for oil- and water-repellency.

| SOLVENT NYLON 66 KNIT FABRIC TEST | | | | |
|---|---|---|---|---|
| Example | Initial Solution | F-113 | % F Retained | Oil/Water Repellency |
| 1 | 0.84 g | 49.16 g | 86 | 5/5 |
| 2 | 0.83 g | 49.17 g | 82 | 5/5 |
| 3 | 0.90 g | 49.10 g | 86 | 5/5 |

A portion of each of the copolymers of Examples 1-3 in MIBK was emulsified in 270 g of water in the presence of the following anionic and cationic systems, homogenized, and the MIBK removed by azeotropic distillation at 45±5° and 80±10 mm of Hg.

| AQUEOUS DISPERSIONS | | | | | |
|---|---|---|---|---|---|
| Example | Polymer Solution | MIBK | Slurry 1260* | Arquad 1250** | Fluorosurfactant*** |
| 1A | 147 g | 3 g | 5.1 g | | |
| 1C | 147 g | 3 g | | 3.7 g | 6.2 g |
| 2A | 145.5 g | 4.5 g | 5.1 g | | |
| 2C | 145.5 g | 4.5 g | | 3.7 g | 6.2 g |
| 3A | 138 g | 12 g | 5.1 g | | |
| 3C | 138 g | 12 g | | 3.7 g | 6.2 g |

*Sodium dodecylbenzenesulfonate (59%)
**Dodecyltrimethylammonium chloride (50%)
*** poly(difluoromethylene),alpha-fluoro-omega-[2-[[2-(trimethylammonio)ethyl]-thio]ethyl],-methyl sulfate (30%)

Each of the foregoing dispersions was diluted with deionized water to an FM content of 8.6 weight percent. Portions of the aqueous dispersions 1A-3A and 1C-3C having an FM content of 8.6 weight percent were applied to nylon 66 knit fabric and PEO-containing nylon fabric, cured and evaluated for heat set percent fluorine retention and oil- and water-repellency

EXAMPLES 4-7

Examples 1-3 were repeated with the following changes. The 3-chloro-2-hydroxypropyl methacrylate was a purchased commercial grade. The combined weight of the monomers in each polymerization was 250 g, with weight proportions of FM/CHPM as follows: 50/50 in Example 4, 65/35 in Example 5, 75/25 in Example 6 and 85/15 in Example 7. In addition, the quantities of initiator, chain-transfer agent and solvent were increased as follows: 5.0 g of AMBN in 25 g of MIBK, 7.5 g of DM, and 275 g of MIBK. The following quantities of polymeric products were obtained: 549.8 g (49.4% solids) in Example 4, 547.9 g (47.2% solids) in Example 5, 549.2 g (47.3% solids) in Example 6 and 533.3 g (47.4% solids) in Example 7. There was no evidence of the white stringy material observed in Examples 1-3.

The polymerization procedure of Examples 4-7 was replicated for Controls A and B, the sole difference being in the ratio of FM/CHPM as follows: 90/10 in Control A and 95/5 in Control B. Control A gave 547.9 g of polymeric products (46.6% solids) and Control B gave 539.1 g of polymeric products (46.2% solids).

Cationic aqueous dispersions of the polymers of Examples 4-7 and Controls A and B were prepared as in Examples 1-3.

EXAMPLES 8 AND 9

The procedure of Examples 6 and 7 was repeated except that the CHPM was a laboratory preparation. The CHPM was prepared as in Examples 1-3 except that the quantities of glacial methacrylic acid, benzyltriethylammonium chloride and methanol were doubled and the quantity of epichlorohydrin was 93.5 g, giving a glacial methacrylic acid/epichlorohydrin mol ratio of about 2/1. The mixture of ingredients was heated to 40±3° with agitation and maintained under those conditions for 48 hours. The product was washed with about 1750 ml of 5% aqueous sodium bicarbonate and 300 ml of ethyl acetate. After separating the upper organic layer, the aqueous layer was washed twice with 200 ml of ethyl acetate. After washing the combined ethyl acetate layers twice with 5% sodium bicarbonate and 4 times with deionized water, they were washed with 200 ml of 5% brine.

Control C was polymerized at a mol ratio of FM/CHPM of 98/2.

The following quantities of polymeric products were obtained: 553.1 g (44.7% solids) in Example 8, 546.6 g (45.2% solids) in Example 9 and 553.1 g (45.4% solids) in Control C. No white stringy material was observed.

The following table provides performance data for polymers of this invention and for control polymers prepared substantially as set forth in Examples 4–9 and Controls A–C. One set of tests was performed on commercial nylon yarn which has a reaction product of a polyglycol and boric acid dispersed throughout its filaments (PEO-Containing Nylon). The other set of tests was run on yarn prepared from standard Nylon 66. Both sets of tests involved application of the aqueous dispersions by use of the Yarnline Finish Application technique and the Mock Beck Dye Test (MBDT). After application of each aqueous polymer dispersion, containing 1% by weight of "Tween 80" sorbitan monooleate based on the weight of fiber, to the yarn, F analysis was performed on specimens of both the treated PEO-Containing Nylon and standard Nylon 66 yarn. A portion of each treated yarn was wound onto separate yarn winding frameworks. Another portion of each treated yarn was wound onto two other yarn winding frameworks and heat-set at about 200° for 2 minutes. Each of the 4 frameworks was then inserted in separate cylindrical cups and the MBDT carried out. After air-drying, the specimens may be heated at about 121° for one minute. Then oil/water-repellencies and F analyses were obtained for all four specimens.

| FM/CHPM Cationic Dispersion | PEO-Containing Nylon | | | | Standard Nylon 66 | | | |
|---|---|---|---|---|---|---|---|---|
| | Not Heat Set | | Heat Set | | Not Heat Set | | Heat Set | |
| | % F Retained | O/W**** | % F Retained | O/W**** | % F Retained | O/W*** | % F Retained | O/W*** |
| *50/50 | 67 | 3/4 | 84 | 3/5 | — | — | — | — |
| *65/35 | 83 | 4/5 | 94 | — | 2/4.5 | — | 5/5 | |
| *75/25 | 82 | 4/4 | 92 | 3/4 | 77 | 2/4 | 97 | 5/5 |
| *85/15 | 52 | 2/3 | 85 | 4/4 | 81 | 1/3 | 76 | 4/5 |
| **90/10 | 58 | 1/3 | 71 | 2/3 | 50 | 1/3 | 66 | 3/5 |
| **95/5 | 48 | 2/3 | 62 | 2/4 | 64 | 1/2 | 67 | 0/4 |
| **98/2 | 25 | 1/1 | 49 | — | 46 | 1/3 | 59 | 0/0 |

*Polymers of this invention.
**Control polymers.
***Oil/Water Repellency after MBDT folowed by heating at 121° for 1 minute.
****Oil/Water Repellency after MBDT.

I claim:

1. Polymers of (i) from about 50 to about 85 parts by weight of a fluorinated monomer or mixture of fluorinated monomers having the formula

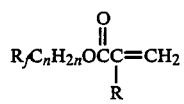

and (ii) from about 50 to about 15 parts by weight of one or more monomers having the formula

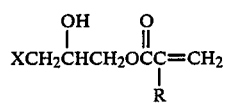

wherein
$R_f$ is straight or branched-chain perfluoroalkyl containing 4–20 carbons;
R is H or $CH_3$;
n is an integer from 1–15; and
X is Cl or Br.

2. Polymers of (i) from about 65 to about 75 parts by weight of a fluorinated monomer or mixture of fluorinated monomers having the formula

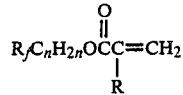

and (ii) from about 35 to about 25 parts by weight of one or more monomers having the formula

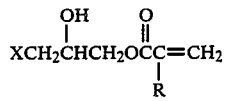

wherein
$R_f$ is straight or branched-chain perfluoroalkyl containing 4–20 carbons;
R is H or $CH_3$;
n is an integer from 1–15; and
X is Cl or Br.

3. The polymers of claim 2 which consist essentially of 75 weight percent of a mixture of said fluorinated monomers and 25 weight percent of 3-chloro-2-hydroxypropyl methacrylate.

4. The polymers of claim 2 which consist essentially of 65 weight percent of a mixture of said fluorine-containing monomers and 35 weight percent of 3-chloro-2-hydroxypropyl methacrylate.

5. The polymers of either claim 1, 3, 4 or 2 wherein R is $CH_3$ and component (i) is a mixture of fluorinated monomers in which $R_f$ is a mixture of perfluoroalkyl groups having the formula $CF_3CF_2(CF_2)_y$— in which y is 2, 4, 6, 8, 10 and 12 in the approximate relative quantities by weight of 2/35/30/18/8/3.

6. A process for imparting oil- and water-repellency to fibrous and filamentary substrates which comprises applying an aqueous dispersion of the polymers of claim 1 to textile filaments as a spin finish during filament manufacture.

7. A process for imparting oil- and water-repellency to fibrous and filamentary substrates which comprises applying an aqueous dispersion of the polymers of claim 2 to textile filaments as a spin finish during filament manufacture.

8. A process for imparting oil- and water-repellency to fibrous and filamentary substrates which comprises applying an aqueous dispersion of the polymers of claim 3 to textile filaments as a spin finish during filament manufacture.

9. A process for imparting oil- and water-repellency to fibrous and filamentary substrates which comprises applying an aqueous dispersion of the polymers of claim 4 to textile filaments as a spin finish during filament manufacture.

10. A process for imparting oil- and water-repellency to fibrous and filamentary substrates which comprises applying an aqueous dispersion of the polymers of claim 5 to textile filaments as a spin finish during filament manufacture.

11. A fibrous or filamentary substrate which contains a coating of the polymers of either claim 1, 2 or 3 in an amount sufficient to impart oil- and water-repellency to said substrate.

12. A fibrous or filamentary substrate which contains a coating of the polymers of claim 5 in an amount sufficient to impart oil- and water-repellency to said substrate.

13. A fibrous or filamentary nylon substrate which contains a coating of the polymers of either claim 1, 2 or 3 in an amount sufficient to impart oil- and water-repellency to said substrate.

14. A fibrous or filamentary nylon substrate which contains a coating of the polymers of claim 5 in an amount sufficient to impart oil- and water-repellency to said substrate.

* * * * *